(12) United States Patent
Patel et al.

(10) Patent No.: US 8,706,371 B1
(45) Date of Patent: Apr. 22, 2014

(54) METHOD FOR PREDICTING REACTIVE CLUTCH LOADS AND PREEMPTIVELY ADJUSTING LINE PRESSURE

(71) Applicant: GM Global Technology Operations LLC, Detroit, MI (US)

(72) Inventors: Krunal P. Patel, Sterling Heights, MI (US); Sean W. McGrogan, Ann Arbor, MI (US); Lawrence A. Kaminsky, White Lake, MI (US); Pinaki Gupta, Wixom, MI (US); Ali K. Naqvi, White Lake, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/772,667

(22) Filed: Feb. 21, 2013

(51) Int. Cl.
*F16D 13/75* (2006.01)
*G06F 17/00* (2006.01)

(52) U.S. Cl.
USPC .......................... 701/68; 701/67; 192/111.12

(58) Field of Classification Search
USPC .......... 701/68, 67, 36, 55, 123; 477/109, 111, 477/114, 120; 192/111.12; 60/459
See application file for complete search history.

(56) References Cited

U.S. PATENT DOCUMENTS

| 2005/0001480 | A1* | 1/2005 | Tabata et al. .................. 303/141 |
| 2008/0006029 | A1* | 1/2008 | Kitou et al. ..................... 60/459 |
| 2008/0262712 | A1* | 10/2008 | Duty et al. ..................... 701/123 |
| 2009/0111644 | A1 | 4/2009 | Kaminsky et al. |

* cited by examiner

*Primary Examiner* — Tan Q Nguyen

(57) ABSTRACT

A method for adjusting hydraulic line pressure applied to one or more clutch devices in an electro-mechanical transmission mechanically-operatively coupled to an internal combustion engine and at least one electric machine includes predicting a first plurality of powertrain parameters for an upcoming event. For each of a plurality of engine torques, a predicted output torque and a predicted clutch load are determined that minimize a total powertrain operating cost based on an operator torque request and the predicted first plurality of powertrain parameters. Hydraulic line pressure is adjusted based on the engine torque having a lowest powertrain operating cost among the plurality of available engine torques.

20 Claims, 4 Drawing Sheets

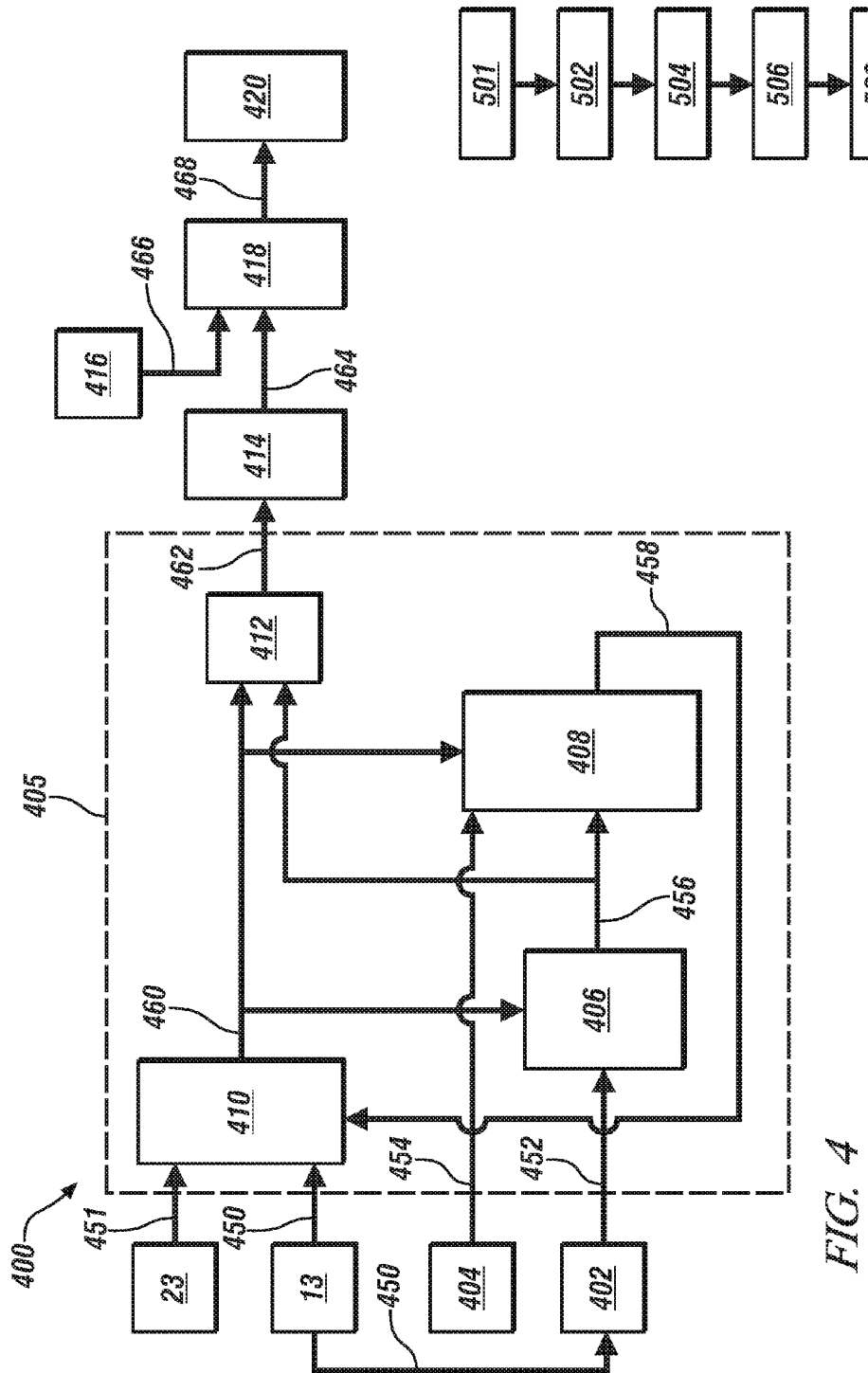

METHOD FOR PREDICTING REACTIVE CLUTCH LOADS AND PREEMPTIVELY ADJUSTING LINE PRESSURE

TECHNICAL FIELD

This disclosure is related to control systems for electro-mechanical transmissions, and more specifically to control of a hydraulic circuit.

BACKGROUND

The statements in this section merely provide background information related to the present disclosure. Accordingly, such statements are not intended to constitute an admission of prior art.

Known powertrain architectures include torque-generative devices, including internal combustion engines and electric machines, which transmit torque through a transmission device to an output member. The output member can be operatively connected to a driveline for a motor vehicle for transmitting tractive torque thereto. Electric machines, operative as motors or generators, generate an input torque to the transmission, independently of an input torque from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating range state and gear shifting, controlling the torque-generative devices, and regulating the electrical power interchange among the electrical energy storage device and the electric machines to manage outputs of the transmission, including torque and rotational speed.

The transmission enables transitions between a plurality of operating range states. The transition from one operating range state to another operating range state may involve transitioning at least one clutch state. The clutch state can include an ON state indicative of the clutch being activated and engaged and an OFF state indicative of the clutch being deactivated and disengaged. Transitions between clutch states include control measures to reduce or eliminate an occurrence of clutch slip during transitions between clutch states. Clutches, in order to avoid slip, remain engaged with a minimum clutch torque capacity whenever a reactive load is transmitted through the clutch. Clutch torque capacity is a function of hydraulic pressure applied to the clutch. Thus, greater hydraulic pressure in the clutch results in a greater clamping force within the clutch and a resulting higher clutch torque capacity. Accordingly, a hydraulic control system utilizes lines charged with hydraulic oil to selectively activate and engage clutches within the transmission.

It is known to control line pressure for achieving a required torque capacity in a clutch based solely on a current estimated clutch load in a reactive manner that can result in increased response times which are undesirable. Generally, increases in the load applied to the clutch are limited by how quickly the clutch capacity is increased in response to small iterative changes to the estimated clutch load, which are ultimately driven by changes in an operator torque request. Such increased response times are undesirable because the reactive load applied to the clutch must wait for a change in the operator torque request. Additionally, torque capacity in some instances needs to be increased despite no change in the operator torque request. This can result in hydraulic line pressure being inadequate, resulting in clutch slippage and decreased drivability.

It is further known to implement crude logic which creates "headroom" for possible upcoming increases in reactive load applied to a clutch by increasing the line pressure applied to the clutch by a predetermined margin. However, increasing the clutch load by the predetermined margin alone requires a trade-off between having a margin that is large enough to allow for a sufficient response, and a margin that is minimized to minimize hydraulic pumping losses. Thus, maintaining the predetermined margin of line pressure applied to the clutch may result in increased response times and decreased fuel economy.

SUMMARY

A method for adjusting hydraulic line pressure applied to one or more clutch devices in an electro-mechanical transmission mechanically-operatively coupled to an internal combustion engine and at least one electric machine includes predicting a first plurality of powertrain parameters for an upcoming event. For each of a plurality of engine torques, a predicted output torque and a predicted clutch load are determined that minimize a total powertrain operating cost based on an operator torque request and the predicted first plurality of powertrain parameters. Hydraulic line pressure is adjusted based on the engine torque having a lowest powertrain operating cost among the plurality of available engine torques.

BRIEF DESCRIPTION OF THE DRAWINGS

One or more embodiments will now be described, by way of example, with reference to the accompanying drawings, in which:

FIG. 4 illustrates a controller for predicting a clutch load of one or more activated clutch devices in the hybrid powertrain of FIG. 1 and adjusting hydraulic line pressure applied to the one or more activated clutch devices, in accordance with the present disclosure; and FIG. 5 illustrates a flowchart for adjusting hydraulic line pressure applied to one or more clutch devices using the optimization controller of FIG. 4, in accordance with the present disclosure.

DETAILED DESCRIPTION

Figure 1:
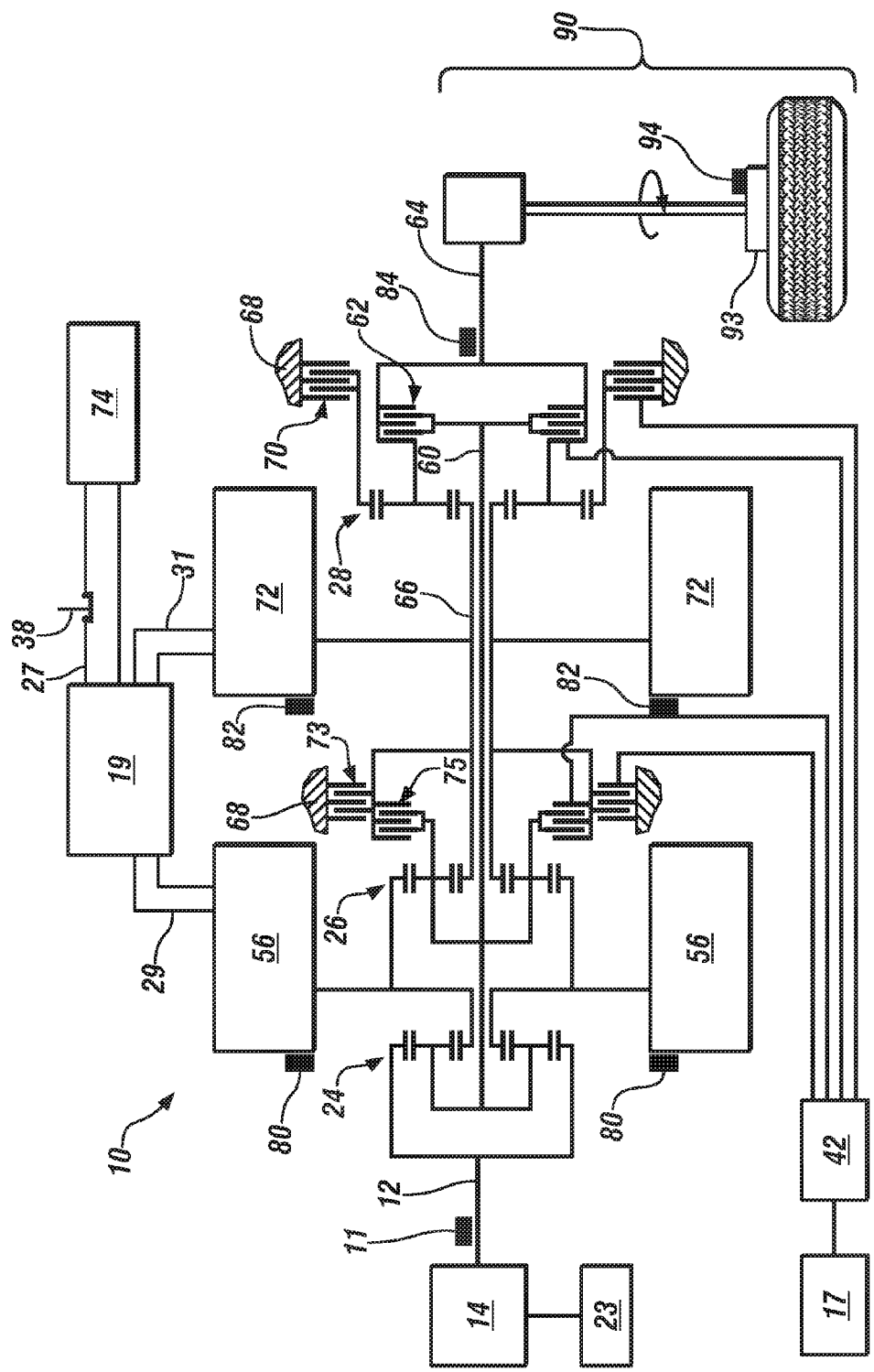
FIG. 1 illustrates an exemplary hybrid powertrain including a hybrid transmission operatively connected to an engine and first and second electric machines, in accordance with the present disclosure.
Figure 2:
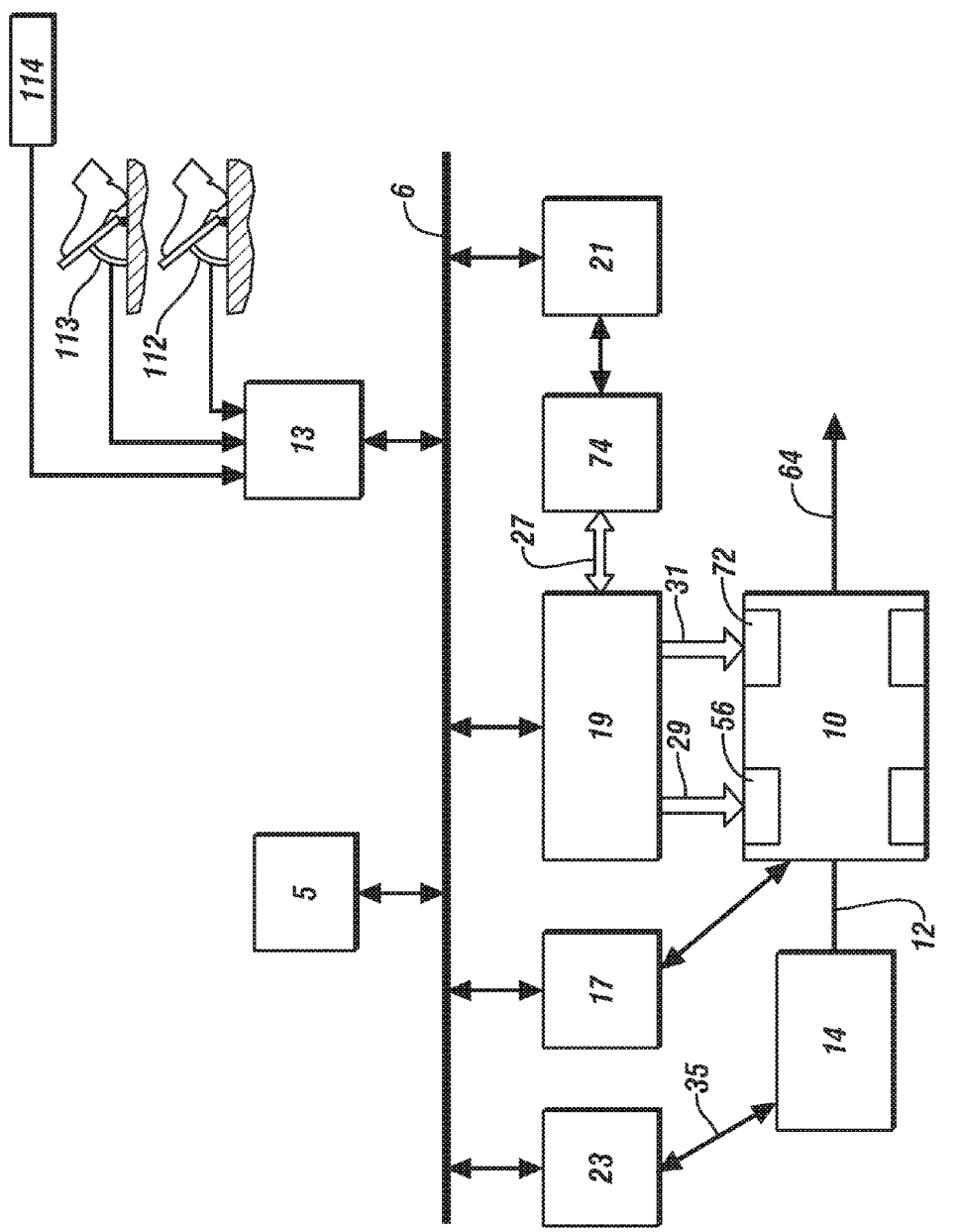
FIG. 2 illustrates an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain includes a two-mode, compound-split, electro-mechanical hybrid transmission 10 operatively connected to an engine 14 and first and second electric machines (MG-A) 56 and (MG-B) 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 includes a multi-cylinder internal combustion engine selectively operative in several states to transmit torque to the transmission 10 via an input shaft 12, and can be either a spark-ignition or a compression-ignition engine. The engine 14 includes a crankshaft operatively coupled to the input shaft 12 of the transmission 10. A rotational speed sensor 11 monitors rotational speed of the input shaft 12. Power output from the engine 14, including rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump and/or a torque management device.

The exemplary transmission 10 includes three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (TCM) 17, is operative to control clutch states. Clutches C2 62 and C4 75 preferably include hydraulically-applied rotating friction clutches. Clutches C1 70 and C3 73 preferably include hydraulically-controlled stationary devices that can be selectively grounded to a transmission case 68. Each of the clutches C1 70, C2 62, C3 73, and C4 75 is preferably hydraulically applied, selectively receiving pressurized hydraulic oil via the hydraulic control circuit 42.

The first and second electric machines 56 and 72 preferably include three-phase AC machines, each including a stator and a rotor, and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably includes a variable reluctance device including a resolver stator and a resolver rotor. The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle, to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters and respective motor control modules configured to receive the torque commands and control inverter states therefrom for providing motor drive or regeneration functionality to meet the commanded motor torques $T_A$ and $T_B$. The power inverters includes known complementary three-phase power electronics devices, and each includes a plurality of insulated gate bipolar transistors for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter include a subset of an overall vehicle control architecture, and provide coordinated system control of the exemplary powertrain described in FIG. 1. The distributed control module system synthesizes pertinent information and inputs, and executes routines to control various actuators to achieve control objectives, including objectives related to fuel economy, emissions, performance, drivability, and protection of hardware, including batteries of ESD 74 and the first and second electric machines 56 and 72. The distributed control module system includes an engine control module (ECM) 23, the TCM 17, a battery pack control module (BPCM) 21, and the TPIM 19. A hybrid control module (HCP) 5 provides supervisory control and coordination of the ECM 23, the TCM 17, the BPCM 21, and the TPIM 19. A user interface (UI) 13 is operatively connected to a plurality of devices through which a vehicle operator controls or directs operation of the electro-mechanical hybrid powertrain. The devices include an accelerator pedal 113 (AP) from which an operator torque request is determined, an operator brake pedal 112 (BP), a transmission gear selector 114 (PRNDL), and a vehicle speed cruise control. The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (LAN) bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface (SPI) bus.

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ($T_{O\_REQ}$), a commanded output torque ($T_{CMD}$) to the driveline 90, an engine input torque command, clutch torques for the torque-transfer clutches C1 70, C2 62, C3 73, C4 75 of the transmission 10; and the torque commands for the first and second electric machines 56 and 72, respectively.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules.

The TCM 17 is operatively connected to the transmission 10 and monitors inputs from sensors to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches and selectively actuates pressure control solenoids and shift solenoids of the hydraulic control circuit 42 to selectively actuate the various clutches C1 70, C2 62, C3 73, and C4 75 to achieve various transmission operating range states, as described hereinbelow.

The BPCM 21 is signally connected to sensors to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The exemplary powertrain selectively operates in one of several operating range states that can be described in terms of an engine state including one of an engine on state (ON) and an engine off state (OFF), and a transmission state including a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to ground the outer gear member of the third planetary gear set 28. The engine state can be one of ON (MI_Eng_On) or OFF (MI_Eng_Off). A second continuously variable mode, i.e., EVT Mode II, or MII, is selected by applying clutch C2 62 only to connect the shaft 60 to the carrier of the third planetary gear set 28. The engine state can be one of ON (MII_Eng_On) or OFF (MII_Eng_Off). For purposes of this description, when the engine state is OFF, the engine input speed is equal to zero revolutions per minute (RPM), i.e., the engine crankshaft is not rotating. A fixed gear operation provides a fixed ratio operation of input-to-output speed of the transmission 10, i.e., $N_I/N_O$, is achieved. A first fixed gear operation (FG1) is selected by applying clutches C1 70 and C4 75. A second fixed gear operation (FG2) is selected by applying clutches C1 70 and C2 62. A third fixed gear operation (FG3) is selected by applying clutches C2 62 and C4 75. A fourth fixed gear operation (FG4) is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 3:
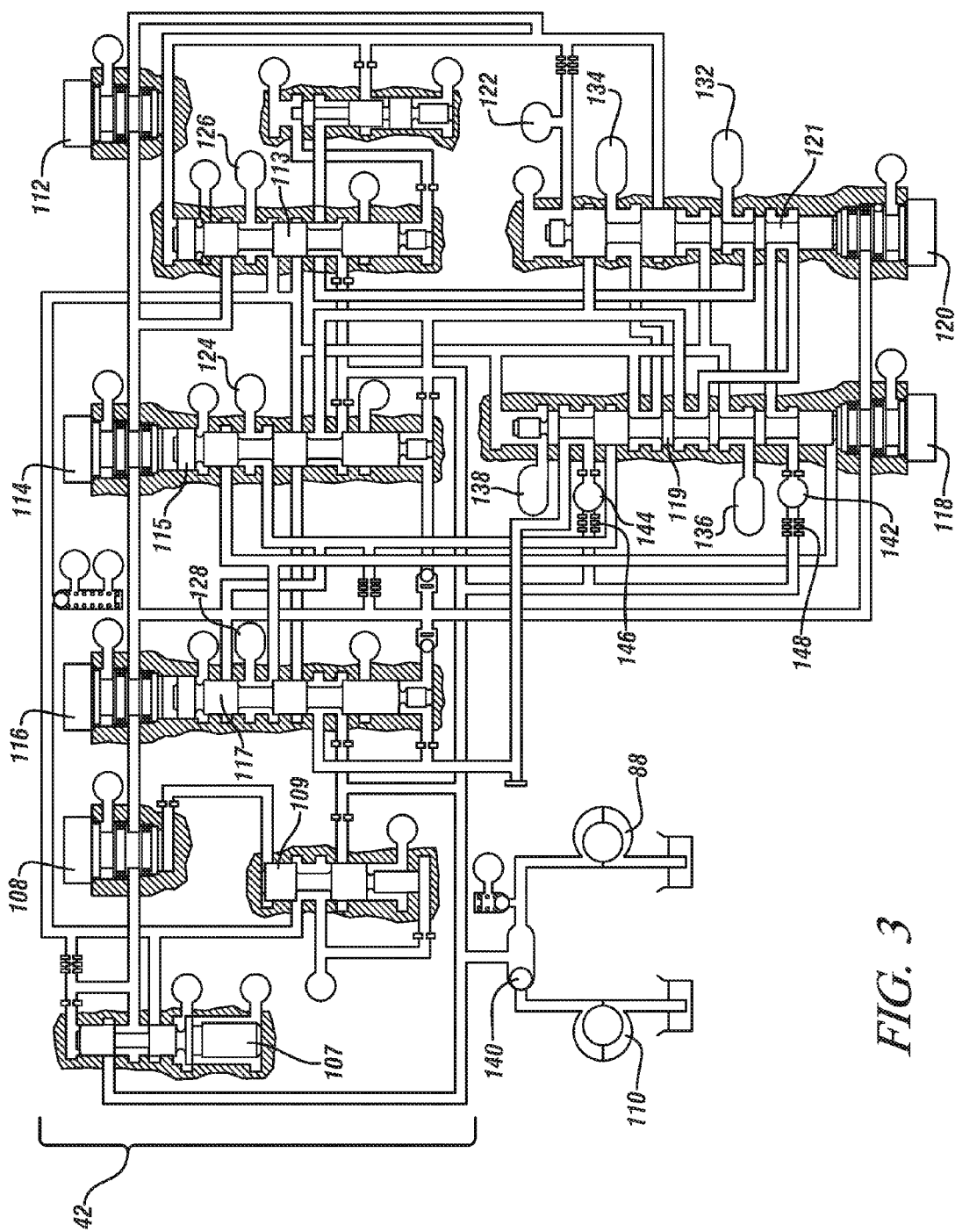
FIG. 3 is a schematic diagram of a hydraulic circuit, in accordance with the present disclosure.

FIG. 3 depicts a schematic diagram of the hydraulic control circuit 42 for controlling flow of hydraulic oil in the exemplary transmission. A main hydraulic pump 88 is driven off the input shaft 12 from the engine 14, and an auxiliary pump 110 controlled by the TPIM 19 to provide pressurized fluid to the hydraulic control circuit 42 through valve 140. The auxiliary pump 110 preferably includes an electrically-powered pump of an appropriate size and capacity to provide sufficient flow of pressurized hydraulic oil into the hydraulic control circuit 42 when operational. The hydraulic control circuit 42 selectively distributes hydraulic pressure to a plurality of devices, including the torque-transfer clutches C1 70, C2 62, C3 73, and C4 75, active cooling circuits for the first and second electric machines 56 and 72, and a base cooling circuit for cooling and lubricating the transmission 10 via passages 142, 144. As previously stated, the TCM 17 activates the various clutches to achieve one of the transmission operating range states through selective actuation of hydraulic circuit flow control devices including variable pressure control solenoids (PCS) PCS1 108, PCS2 112, PCS3 114, PCS4 116 and solenoid-controlled flow management valves, X-valve 119 and Y-valve 121. The hydraulic control circuit 42 is fluidly connected to pressure switches PS1, PS2, PS3, and PS4 via passages 124, 122, 126, and 128, respectively. The pressure control solenoid PCS1 108 has a control position of normally high and is operative to modulate the magnitude of fluidic pressure in the hydraulic circuit through fluidic interaction with controllable pressure regulator 107 and spool valve 109. The controllable pressure regulator 107 and spool valve 109 interact with PCS1 108 to control hydraulic pressure in the hydraulic control circuit 42 over a range of pressures and may provide additional functionality for the hydraulic control circuit 42. Pressure control solenoid PCS2 112 has a control position of normally high, and is fluidly connected to spool valve 113 and operative to effect flow therethrough when actuated. Spool valve 113 is fluidly connected to pressure switch PS3 via passage 126. Pressure control solenoid PCS3 114 has a control position of normally high, and is fluidly connected to spool valve 115 and operative to effect flow therethrough when actuated. Spool valve 115 is fluidly connected to pressure switch PS1 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each include flow management valves controlled by solenoids 118, 120, respectively, in the exemplary system, and have control states of High (1) and Low (0). The control states refer to positions of each valve to which control flow to different devices in the hydraulic control circuit 42 and the transmission 10. The X-valve 119 is operative to direct pressurized fluid to clutches C3 73 and C4 75 and cooling systems for stators of the first and second electric machines 56 and 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PS2 via passage 122.

The hydraulic control circuit 42 includes a base cooling circuit for providing hydraulic oil to cool the stators of the first and second electric machines 56 and 72. The base cooling circuit includes fluid conduits from the valve 140 flowing directly to a flow restrictor which leads to fluidic passage 144 leading to the base cooling circuit for the stator of the first electric machine 56, and to a flow restrictor which leads to fluidic passage 142 leading to the base cooling circuit for the stator of the second electric machine 72. Active cooling of stators for the first and second electric machines 56 and 72 is effected by selective actuation of pressure control solenoids PCS2 112, PCS3 114 and PCS4 116 and solenoid-controlled flow management valves X-valve 119 and Y-valve 121, which leads to flow of hydraulic oil around the selected stator and permits heat to be transferred therebetween, primarily through conduction.

An exemplary logic table to accomplish control of the exemplary hydraulic control circuit 42 to control operation of the transmission 10 in one of the transmission operating range states is provided with reference to Table 2, below.

TABLE 2

| Transmission Operating Range State | X-Valve Logic No Latch | Y-Valve Logic C2 Latch | PCS1 Normal High | PCS2 Normal High | PCS3 Normal High | PCS4 Normal Low |
|---|---|---|---|---|---|---|
| EVT Mode I | 0 | 0 | Line Modulation | MG-B Stator Cool | C1 | MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

A Low Range is defined as a transmission operating range state including one of the first continuously variable mode and the first and second fixed gear operations. A High Range is defined as a transmission operating range state including one of the second continuously variable mode and the third and fourth fixed gear operations. Selective control of the X-valve 119 and the Y-valve 121 and actuation of the solenoids PCS2 112, PCS3 114, PCS4 116 facilitate flow of hydraulic oil to activate clutches C1 70, C2 63, C3 73, and C4 75, and provide cooling for the stators and the first and second electric machines 56 and 72.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. The operating range state can be determined by an optimization routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging.

As mentioned above, the purpose of the hydraulic control system is to provide pressurized hydraulic oil for a number of functions throughout a hybrid powertrain. One having ordinary skill in the art will appreciate that control of the hydraulic control system in order to enable smooth and consistent operation of the functions served by providing a supply of hydraulic flow requires an understanding of $P_{LINE}$. $P_{LINE}$ is important to understanding the capacity of the hydraulic control system necessary to fill required functions. $P_{LINE}$ is also important to managing the operation of the pump or pumps utilized to provide the supply of hydraulic flow to the hydraulic control system.

$P_{LINE}$ describes the capacity that the hydraulic control system possesses to fulfill a required function. For instance, in a clutch control function, $P_{LINE}$ describes the maximum clamping force immediately available to the clutch. As described above, the capacity of the clutch to transmit reactive torque depends upon the clamping force applied to the clutch. Additionally, it will be appreciated that $P_{LINE}$ describes how quickly the clutch can be filled. In another example, one having ordinary skill in the art will appreciate that, with respect to electric machine cooling, either serving a base machine cooling function through the electric machine or selectively serving an active machine cooling function, the quantity of hydraulic oil passing through the heat exchange mechanism of the electric machine and the resulting heat exchange mechanism of the electric machine and the resulting heat exchange capacity of the function rise as a function of $P_{LINE}$. In another example, the hydraulic oil can be used to lubricate a device, for instance, a bearing. The resulting flow to the device through a fixed orifice and the resulting ability of the hydraulic flow to meet the lubrication function is a function of $P_{LINE}$.

A hydraulically activated clutch device utilizes selectively activated pressurized flow of hydraulic fluid to create a desired clutch torque capacity when the clutch is activated and engaged. Embodiments are directed toward the desired clutch torque capacity corresponding to a minimum clutch torque capacity required to eliminate the occurrence of slip in the activated and engaged clutch device. FIG. 4 illustrates a controller for predicting a clutch load of one or more activated clutch devices and adjusting hydraulic line pressure applied to the one or more activated clutch devices, in accordance with the present disclosure. The controller 400 can be implemented within the control module 5 of FIG. 2. The controller 400 includes the ECM 23, the UI 13, a predictive powertrain parameter module 402, a transient powertrain parameter module 404, a power loss optimization routine 405, a cost hysteresis module 414, an estimated clutch load module 416, a reactive clutch load management module 418 and a line pressure ($P_{LINE}$) control module 420.

The power loss optimization routine 405 iteratively determines an operating cost for each of a plurality of available engine torques based on an operator torque request and selects the engine torque ($T_E$) having the lowest powertrain operating cost as an optimum engine torque ($T_{E\_OPT}$). A predicted clutch load corresponding to the $T_{E\_OPT}$ can be utilized for preemptively adjusting hydraulic line pressure ($P_{LINE}$) applied to one or more clutch devices. For instance, the one or more clutch devices can include C1 70, C2 62, C3 73, and C4 75 that are predicted to be activated and engaged during an upcoming event based on the operator torque request. The power loss optimization routine 405 includes an optimization module 406, a cost function module 408, a search function module 410 and a determination module 412.

The ECM 23 inputs a range of allowable engine torques 451 from a minimum allowable engine torque to a maximum allowable engine torque into the search function module 410. It will be understood that the allowable engine torques 451 correspond to a given engine state, wherein the power loss optimization routine 405 may iteratively determine an operating cost for each of a plurality of available engine torques for one or more engine states. The UI 13 inputs an operator torque request 450 into the search function module 410 and the predictive powertrain parameters module 402. The search function module 410 performs a search, during each iteration of the power loss optimization routine 405, to determine an engine torque $T_E$ 460 provided to each of the determination module 412, the optimization module 406 and the cost function module 408. In an exemplary embodiment, the search function module 410 performs a golden search to determine the $T_E$ 460 during each iteration using a golden ratio. Alternatively, the search function module 410 may use any suitable search to determine $T_E$ 460 for each iteration. During the first iteration, the $T_E$ 460 determined by the search function module 410 is chosen as the optimum engine torque. However, the $T_E$ 460 associated with a lowest powertrain operating cost after all iterations have been performed by the power loss optimization routine 405, will be chosen as the optimum engine torque, $T_{E\_OPT}$.

The predictive powertrain parameter module 402 receives the operator torque request 450 and predicts a first plurality of powertrain parameters 452 that are input to the optimization module 406. The predicted first plurality of powertrain parameters 452 can include a predicted clutch state for one or more clutches, a predicted output torque, a predicted engine speed, predicted motor torque limits, predicted clutch torque limits and predicted electrical energy storage device power limits. For each of the plurality of allowable engine torques 451, the optimization module 406 determines an output 456 indicating a predicted output torque and a predicted clutch load that minimizes a total powertrain operating cost based on the predicted first plurality of powertrain parameters 452.

During each iteration of the power loss optimization routine 405, the cost function module 408 receives the predicted output torque of the output 456 from the optimization module 406, the engine torque $T_E$ 460 from the search function module 410 and a second plurality of powertrain parameters 454 from the transient powertrain parameter module 404. The transient powertrain parameter module 404 outputs the second plurality of powertrain parameters 454 based on the operator torque request 450. The second plurality of powertrain parameters 454 includes an electrical energy storage device state of charge, an output speed of the vehicle, and the operator torque request. Accordingly, the cost function module 408 determines a powertrain operating cost 458 during each iteration, wherein each iteration corresponds to respective ones of the plurality of available engine torques. The powertrain operating cost 458 is then input to the search function module 410 where a search is performed for the subsequent iteration.

Thus, the cost function module 408 monitors each available engine torque and each respective predicted output torque that minimizes the total powertrain operating cost, while concurrently monitoring the second plurality of powertrain parameters 454. Thereafter, for each available engine torque and each respective predicted output torque, the cost function module 408 determines the powertrain operating cost 458 based on the second plurality of powertrain parameters. Once all iterations are complete, the determination module 412 selects the engine torque ($T_E$ 460) having the lowest powertrain operating cost among the plurality of available engine torques, e.g., the determination module 412 selects the $T_{E\_OPT}$. The determination module 412 further receives the output 456 indicating the predicted clutch load for each iteration. Accordingly, the determination module 412 further determines the predicted clutch load that is determined for the $T_{E\_OPT}$, as an optimum predicted clutch load 462.

In embodiments where the power loss optimization routine 405 iteratively determines the operating cost for each of a plurality of available engine torques for each of a plurality of engine states, an optimum engine torque, $T_{E\_OPT}$, is selected by the determination module 412 for each engine state. The $T_{E\_OPT}$ among the plurality of engine states having a lowest powertrain operating cost is selected as a final engine torque, $T_{E\_Final}$. Accordingly, the determination module 412 further determines the predicted clutch load that is determined for the $T_{E\_Final}$, as a final predicted clutch load. Further, the cost hysteresis module 414 can be utilized to apply a stabilization cost to the lowest powertrain operating cost among the plurality of engine states, e.g., the powertrain operating cost associated with $T_{E\_Final}$. The stabilization cost has a magnitude sufficient for avoiding any oscillations from the engine state respective to the final engine torque. Accordingly, when stabilization is applied, the cost hysteresis module outputs a stabilized final predicted clutch load 464. It will be appreciated that if the power cost optimization routine 405 is only determining the operating cost for each of a plurality of available engine torques for one engine state, the cost hysteresis module 414 may be bypassed.

It will be appreciated that powertrain operating costs are associated with operating costs related to vehicle drivability, fuel economy, electrical energy storage device usage, and emissions. Operating costs may include the engine power losses, electric motor power losses, electrical energy storage device power losses, brake power losses, and mechanical power losses associated with operating the multi-mode powertrain at specific operating points for the engine 14 and the non-combustion electric machines 56 and 72. Accordingly, lower operating costs can be associated with lower fuel consumption at high conversion efficiencies, lower electrical energy storage device power usage, and lower emissions for each engine speed/load operating point, and take into account the candidate operating state of the engine 14.

The reactive clutch load management module 418 compares the optimum predicted clutch load 462 determined by the determination module 412 (or the stabilized final predicted clutch load 464 determined by the cost hysteresis module 414) and an estimated clutch load 466 determined by the estimated clutch load module 416 for each of the one or more clutch devices. The estimated clutch load 466 may correspond to an estimated transient clutch load in addition to a predetermined margin of $P_{LINE}$ for each of the one or more applied and engaged clutch devices. When the optimum predicted clutch load 462 (or the stabilized predicted clutch load 464), e.g., the predicted clutch load having the lowest powertrain operating cost, is greater than the estimated clutch load 466, the reactive clutch load management module 418 determines an adjusted hydraulic line pressure, $P_{LINE\_ADJ}$ 468, applied to the one or more clutch devices that are activated and engaged for the upcoming event. For instance, when the optimum predicted clutch load 464 is greater than the estimated clutch load 466, the $P_{LINE\_ADJ}$ 468 increases the $P_{LINE}$ applied to the one or more clutch devices by a magnitude corresponding to the amount that the optimum predicted clutch load 464 exceeds the estimated clutch load 466 for each of the one or more clutch devices. The $P_{LINE\_ADJ}$ 468 maintains a minimum $P_{LINE}$ for achieving the predicted clutch load (e.g, the optimum predicted clutch load or the stabilized final predicted clutch load) that is determined for the engine torque (e.g., $T_{E\_OPT}$ or $T_{E\_Final}$) having the lowest powertrain operating cost. Accordingly, the $P_{LINE\_ADJ}$ 468 for maintaining the minimum $P_{LINE}$ is provided to the $P_{LINE}$ control module 420 for delivering hydraulic line pressure within the hydraulic control circuit 42 of FIG. 3, in accordance with the $P_{LINE\_ADJ}$ 468.

It will be appreciated that when the optimum predicted clutch load 462 (or the stabilized predicted clutch load 464) is not greater than the estimated clutch load 466, the $P_{LINE}$ applied to the one or more clutch devices corresponds to the estimated clutch load, i.e., the estimated transient clutch load in addition to the predetermined margin of $P_{LINE}$.

FIG. 5 illustrates a flowchart for adjusting hydraulic line pressure applied to one or more clutch devices using the controller 400 of FIG. 4, in accordance with the present disclosure. For simplicity, the flowchart will only refer to adjusting hydraulic line pressure applied to one clutch device; however, the flowchart is equally applicable to adjusting hydraulic line pressure applied to more than one clutch device. Table 3 is provided as a key to the flowchart wherein the numerically labeled blocks and the corresponding functions are set forth as follows.

TABLE 3

| BLOCK | BLOCK CONTENTS |
|---|---|
| 501 | Start |
| 502 | Predict a first plurality of powertrain parameters. |
| 504 | For each available $T_E$, determine a predicted output torque and a predicted clutch load that minimizes a total powertrain operating cost. |
| 506 | Selecting the $T_E$ having the lowest powertrain operating cost. |
| 508 | Adjust $P_{LINE}$ applied to a clutch device based on the $T_E$ having the lowest powertrain operating cost. |

The flowchart starts at block 501, and predicts the first plurality of powertrain parameters 452 at block 502. The first plurality of powertrain parameters 452 are predicted within the predictive powertrain parameter module 402 based on the operator torque request 450. As aforementioned, the predicted first plurality of powertrain parameters 452 can include a predicted clutch state, a predicted output torque, a predicted engine speed, predicted motor torque limits, predicted clutch torque limits and predicted electrical energy storage device power limits.

At block 504, a predicted output torque and a predicted clutch load that minimizes a total powertrain operating cost is determined by the optimization module 406 for each available $T_E$. As aforementioned, the ECM 23 inputs a range of allowable engine torques 451 from a minimum allowable engine torque to a maximum allowable engine torque is input to the search function module 410.

In embodiments where the power loss optimization routine 405 iteratively determines the operating cost for each of a plurality of available engine torques for each of a plurality of engine states, block 504 using the optimization module 406 further determines the predicted output torque and the predicted clutch load for each one of the plurality of engine states, wherein each engine state includes a respective plurality of available engine torques.

At block 506, the $T_E$ having the lowest powertrain operating cost is selected by the determination module 412. As aforementioned, the selected $T_E$ having the lowest powertrain operating cost can be referred to as an optimum engine torque, $T_{E\_OPT}$. The powertrain operating cost for each $T_E$ 460 is determined by the cost function module 408 based on the second plurality of powertrain parameters 454 and the output 456 indicating the predicted output torque respective to the $T_E$ 460 input to the cost function module 408. As aforementioned, the second plurality of powertrain parameters 454 includes an electrical energy storage device state of charge, an output speed and the operator torque request 450.

In embodiments where the power loss optimization routine 405 iteratively determines the operating cost for each of a plurality of available engine torques for each of a plurality of engine states, block 506 using the determination module 412 further selects the $T_E$ having the lowest powertrain operating cost for each one of the plurality of engine states, wherein each engine state includes a respective plurality of available engine torques. Thus, each engine state includes a respective optimum engine torque, $T_{E\_OPT}$. For instance, the engine torque having the lowest powertrain operating cost can be selected for first, second, third and fourth engine states. In an exemplary embodiment, the first engine state can include all cylinders being fueled; the second engine state can include all cylinders being un-fueled; the third engine state can include half of the cylinders being fueled; and the fourth engine state can include half of the cylinders being un-fueled. Thereafter, the determination module 412 selects a final engine torque, $T_{E\_Final}$, having the lowest powertrain operating cost among the plurality of engine states. In other words, the $T_{E\_OPT}$ having the lowest powertrain operating cost among the plurality of engine states is selected by the determination module 412 as the $T_{E\_Final}$.

At block 508, the hydraulic line pressure, $P_{LINE}$, applied to the clutch is adjusted based on the $T_E$ having the lowest powertrain operating cost. The adjusted hydraulic line pressure, $P_{LINE\_ADJ}$ 468, is determined by the reactive clutch load management module 418 when the predicted clutch load (e.g., optimum clutch load 462 or stabilized final clutch load 464) is greater than the estimated clutch load 466. The $P_{LINE\_ADJ}$ 468 is determined to maintain a minimum $P_{LINE}$ for achieving the predicted clutch load 464 determined for the $T_E$ having the lowest powertrain operating cost. As aforementioned, the $T_E$ having the lowest powertrain operating cost corresponds to the $T_{E\_OPT}$, or when more than one engine states are being optimized, the $T_E$ having the lowest powertrain operating cost corresponds to the $T_{E\_Final}$. Thereafter, the $P_{LINE}$ control module 420 delivers the hydraulic line pressure within the hydraulic control circuit 42 of FIG. 3, in accordance with the $P_{LINE\_ADJ}$ 468.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for adjusting hydraulic line pressure applied to a clutch device in an electro-mechanical transmission mechanically-operatively coupled to an internal combustion engine and at least one electric machine, comprising:
   predicting a first plurality of powertrain parameters for an upcoming event based on an operator torque request;
   determining, for each of a plurality of available engine torques, a predicted output torque and a predicted clutch load that minimizes a total powertrain operating cost based on the predicted first plurality of powertrain parameters; and
   adjusting hydraulic line pressure based on the engine torque having a lowest powertrain operating cost from among the plurality of available engine torques.

2. The method of claim 1, wherein the hydraulic line pressure is adjusted when the predicted clutch load that is determined for the engine torque having the lowest powertrain operating cost is greater than an estimated clutch load.

3. The method of claim 2, wherein the hydraulic line pressure is adjusted to maintain a minimum hydraulic line pressure for achieving the predicted clutch load that is determined for the engine torque having the lowest powertrain operating cost.

4. The method of claim 1, wherein the engine torque having the lowest powertrain operating cost is determined using a golden ratio search function.

5. The method of claim 4, wherein the golden ratio search function determines the engine torque having the lowest powertrain operating cost by:
   monitoring each available engine torque and each respective predicted output torque that minimizes the total powertrain operating cost;
   monitoring a second plurality of powertrain parameters;

determining, for each available engine torque and each respective predicted output torque, a powertrain operating cost based on the second plurality of powertrain parameters; and selecting, based on the determined powertrain operating costs, the engine torque having the lowest powertrain operating cost from among the plurality of available engine torques.

6. The method of claim 1, wherein the predicted first plurality of powertrain parameters for the upcoming event comprises: a predicted clutch state for said clutch device, a predicted output torque, a predicted engine speed, predicted motor torque limits, predicted clutch torque limits and predicted electrical energy storage device power limits.

7. The method of claim 5, wherein the second plurality of powertrain parameters comprises: an electrical energy storage device state of charge, an output speed, and the operator torque request.

8. The method of claim 1, wherein the upcoming event includes any combination of a transmission shift, an output torque change, and an engine torque change.

9. The method of claim 1, wherein powertrain operating costs are based on factors related to vehicle drivability, fuel economy, emissions and electrical energy storage device usage.

10. Method for adjusting hydraulic line pressure applied to one or more clutch devices in an electro-mechanical transmission mechanically-operatively coupled to an internal combustion engine and at least one electric machine, comprising:

predicting a first plurality of powertrain parameters for an upcoming event based on an operator torque request, said upcoming event including any combination of a transmission shift, an output torque change, and an engine torque change;

for each one of a plurality of engine states each having a respective plurality of available engine torques determining, for each of the plurality of available engine torques, a predicted clutch load for each of the one or more clutch devices and a predicted output torque that minimizes a total powertrain operating cost based on the predicted first plurality of powertrain parameters, and selecting the engine torque having the lowest powertrain operating cost from among the plurality of available engine torques; and adjusting hydraulic line pressure based on a final engine torque having the lowest powertrain operating cost from among the plurality of engine states.

11. The method of claim 10, wherein selecting the engine torque having the lowest powertrain operating cost from among the plurality of available engine torques comprises:

selecting, for a first engine state of the plurality of engine states, the engine torque having the lowest powertrain operating cost from among the plurality of available engine torques for the first engine state;

selecting, for a second engine state of the plurality of engine states, the engine torque having the lowest powertrain operating cost from among the plurality of available engine torques for the second engine state;

selecting, for a third engine state of the plurality of engine states, the engine torque having the lowest powertrain operating cost from among the plurality of available engine torques for the third engine state; and selecting, for a fourth engine state of the plurality of engine states, the engine torque having the lowest powertrain operating cost from among the plurality of available engine torques for the fourth engine state.

12. The method of claim 11, wherein the first engine state comprises all cylinders being fueled;

the second engine state comprises all cylinders being un-fueled;

the third engine state comprises half of the cylinders being fueled; and the fourth engine state comprises half of the cylinders un-fueled.

13. The method of claim 10, further comprising:

prior to the adjusting the hydraulic line pressure, applying a stabilization cost to the final engine torque having the lowest powertrain operating cost from among the plurality of engine states, the stabilization cost having a magnitude sufficient for avoiding oscillations from the engine state corresponding to the final engine torque.

14. The method of claim 10, wherein the hydraulic line pressure is adjusted when the predicted clutch load that is determined for the final engine torque is greater than an estimated clutch load.

15. The method of claim 14, wherein the hydraulic line pressure is adjusted to maintain a minimum hydraulic line pressure for achieving the predicted clutch load that is determined for the final engine torque.

16. The method of claim 10, wherein the engine torque having the lowest powertrain operating cost from among the plurality of engine torques for each one of the plurality of engine states is selected by:

monitoring each available engine torque and each respective predicted output torque that minimizes the total powertrain operating cost;

monitoring a second plurality of powertrain parameters;

determining, for each available engine torque and each respective predicted output torque, a powertrain operating cost based on the second plurality of powertrain parameters; and selecting, based on the determined powertrain operating costs, the engine torque having the lowest powertrain operating cost from among the plurality of available engine torques for each one of the plurality of engine states.

17. The method of claim 16, wherein the second plurality of powertrain parameters comprises: an electrical energy storage device state of charge, an output speed, and the operator torque request.

18. The method of claim 16, wherein the lowest powertrain operating cost is associated with operating costs related to vehicle drivability, fuel economy, electrical energy storage device usage, and emissions.

19. The method of claim 10, wherein the predicted first plurality of powertrain parameters for the upcoming event includes: a predicted clutch state for one or more clutches, a predicted output torque, a predicted engine speed, predicted motor torque limits, predicted clutch torque limits and predicted electrical energy storage device power limits.

20. An apparatus for controlling a powertrain comprising:

an electro-mechanical transmission mechanically-operatively coupled to an internal combustion engine and at least one electric machine adapted to selectively transmit mechanical power to an output member via selective application of one or more hydraulically-applied clutch devices; and a controller implemented within a control module including a predictive powertrain parameter module configured to predict a first plurality of powertrain parameters during an upcoming event;

an optimization module configured to determine, for each of a plurality of available engine torques, a predicted output torque and a predicted clutch load that minimizes a total powertrain operating cost based on an operator torque request and the predicted first plurality of powertrain parameters; and a line pressure control module configured to adjust hydraulic line pressure applied to the clutch device based on the engine torque having a lowest powertrain operating cost among the plurality of available engine torques.

* * * * *